United States Patent [19]

Anderson

[11] 4,440,066

[45] Apr. 3, 1984

[54] DIGITAL PNEUMATIC MODULATOR

[75] Inventor: Terry M. Anderson, Minnetonka, Minn.

[73] Assignee: The Anderson Cornelius Company, Eden Prairie, Minn.

[21] Appl. No.: 253,540

[22] Filed: Apr. 13, 1981

[51] Int. Cl.³ ...................... F15B 13/044; G05D 23/00

[52] U.S. Cl. ........................................ 91/459; 236/84; 91/DIG. 1

[58] Field of Search .................... 91/DIG. 1, 459, 448; 236/840

[56] References Cited

U.S. PATENT DOCUMENTS

| | | | |
|---|---|---|---|
| 2,348,454 | 5/1944 | Cunningham | 236/84 |
| 2,999,482 | 9/1961 | Bower | 91/DIG. 1 |
| 3,782,250 | 1/1974 | Kiszewski | 91/459 |
| 4,261,509 | 4/1981 | Anders et al. | 236/84 |

FOREIGN PATENT DOCUMENTS

| | | | |
|---|---|---|---|
| 682218 | 3/1964 | Canada | 91/DIG. 1 |
| 2033968 | 5/1980 | United Kingdom | 91/448 |

*Primary Examiner*—Robert E. Garrett
*Assistant Examiner*—Richard L. Klein
*Attorney, Agent, or Firm*—James R. Haller

[57] ABSTRACT

An improvement in facility management systems that allows an electronic control unit to be interfaced with a pneumatic cylinder unit. The digital pneumatic modulator of the improvement includes a solenoid valve controlled pneumatic input port, a solenoid valve controlled pneumatic exhaust port, and a flow controlled pneumatic exit port for connection with a pneumatic cylinder.

3 Claims, 3 Drawing Figures

DIGITAL PNEUMATIC MODULATOR

TECHNICAL FIELD

This invention relates generally to facility management systems and apparatus, and more particularly to interface modulation means for controlling a pneumatic cylinder by an electronic control and sensor unit.

BACKGROUND ART

Facility management entails the area of monitoring and controlling various facets of operating an industrial, commercial or residential establishment. These facets can include environmental systems, life safety and security systems, equipment systems, communication systems, and maintenance services.

When broadly considered, most facility management systems meet at least three operative criteria. First, the system monitors one or more facility management parameters. For instance, a system may monitor temperature, use or non-use of a particular device, or the opening or closing of a window.

Second, a facility management system will compare the monitored parameter with some preselected and desired status. Stated another way, the system must be able to determine whether a monitored temperature reading falls within an acceptable range, whether an operating piece of equipment should in fact not be operative or whether a window should be closed.

Third, a facility management system will interact with the facility such that the parameter being monitored may be affected. Continuing through with the examples provided above, the system might be required to initiate or deactivate a heating unit, close the open window, or deactivate the monitored equipment.

When a facility management system must exercise such control through physical movement, such as by opening a window or by closing a damper, one of two general methods of control are typically used: electronic and pneumatic.

Where rotational physical movement best serves the control function, then an electronic control system will generally prove most efficient. Where straight line movement provides better control capability, however, a pneumatic control system will often be preferred.

Typically, such straight line movement may be pneumatically accomplished by use of an airtight cylinder and piston arrangement. The introduction or release of pressurized air to or from the cylinder allows the piston to move back and forth. The piston operably connects to the controlled mechanism, and as the piston moves, the controlled mechanism may be appropriately manipulated.

At this point, a problem may be identified. Although pneumatic control mechanisms provide much better control than do electronic control mechanisms where straight line movement is required, typical control units that are suitable for use with pneumatic systems are often unsatisfactory. Such units are commonly viewed as deficient with respect to accuracy, flexibility, and reaction time. In contrast, electronic control units are very accurate, flexible and quick.

For certain applications, then, it would be desirable to provide a facility management system that included both an electronic control unit and a pneumatic cylinder arrangement. Such a system would borrow from the best of both systems. Unfortunately, the provision of an adequate interface between these two distinct system elements has been difficult. Prior art mechanisms that interface between an electronic control unit and a pneumatic cylinder unit tend to be complicated and expensive.

Furthermore, the interfacing solution should be one that can be harmoniously combined with an already installed pneumatic control system as where an operator seeks to upgrade an existing pneumatic control system with an electronic control unit.

In short, there is a need for a modulating unit that will successfully interface an electronic control unit and a pneumatic cylinder unit. Such a modulating unit should allow the complete system to gain the maximum benefits of both elements. Ideally, the modulating unit will be simple of manufacture and inexpensive to construct. Finally, the modulating unit should be of such design as to allow relatively simple upgrading of an existing pneumatic facility management system by parallel addition of an electronic control unit.

DISCLOSURE OF INVENTION

The instant invention comprises a digital pneumatic modulator that may be added to an existing pneumatic facility management system. The digital pneumatic modulator will allow an electronic control unit to be connected to the system and to control a pneumatic cylinder unit. The digital pneumatic modulator allows the system to benefit both from the precision and efficiency of the electronic control unit and the precision and efficiency of the pneumatic cylinder unit.

The digital pneumatic modulator essentially comprises two solenoid valves, a pneumatic T intersection, and a flow control unit. The input of the first solenoid valve connects to a source of pressurized air. The output of this same solenoid valve connects to the input of the second solenoid valve by one branch of the pneumatic T intersection. The output of the second solenoid valve remains unconnected and serves as an exhaust port.

The leg of the pneumatic T intersection connects to a flow control device. The output of the flow control device connects pneumatically to the pneumatic cylinder unit.

Upon properly energizing or de-energizing the two solenoid valves, by use of an electronic control unit, the operator may selectively connect the pneumatic cylinder unit to the supply of pressurized air through the first solenoid valve, or to an exhaust port through the second solenoid valve. The flow control device may be used advantageously to accommodate the digital pneumatic modulator with a great variety of electronic control units and pneumatic cylinders of various sizes and ratings.

BRIEF DESCRIPTION OF THE DRAWINGS

These and other attributes of the instant invention will become more apparent upon a review and study of the following detailed description of the best mode for carrying out the invention, particularly when reviewed in conjunction with the drawings, wherein.

BEST MODE FOR CARRYING OUT THE INVENTION

Figure 1:
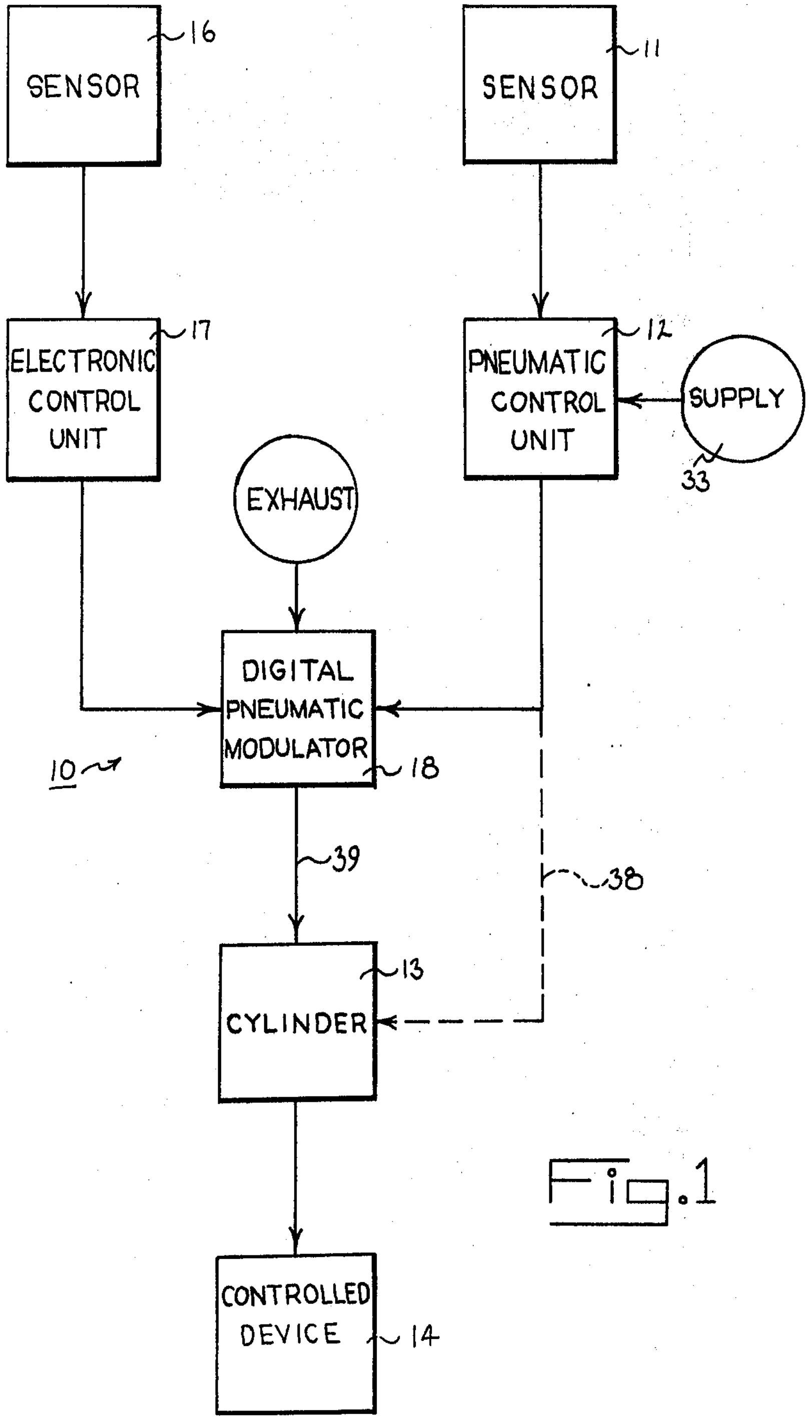
FIG. 1 is a block diagram depiction of a facility management system that incorporates the digital pneumatic modulator of the invention.

Referring now to the drawings, and in particular to FIG. 1, the apparatus of the invention may be viewed as depicted in block diagram form by the numeral 10. The apparatus (10) consists of an improvement upon a facility management system that includes a first sensor unit (11), a pneumatic control unit (12), a cylinder unit (13) and a controlled device (14). By use of the improvement, a second sensor unit (16) and an electronic control unit (17) may be added pursuant to a parallel connection. Each of these components will be described in more detail following a detailed description of the digital pneumatic modulator (18) of the invention that allows the electronic control unit (17) to be added to the previously installed pneumatic control system.

Figure 2:
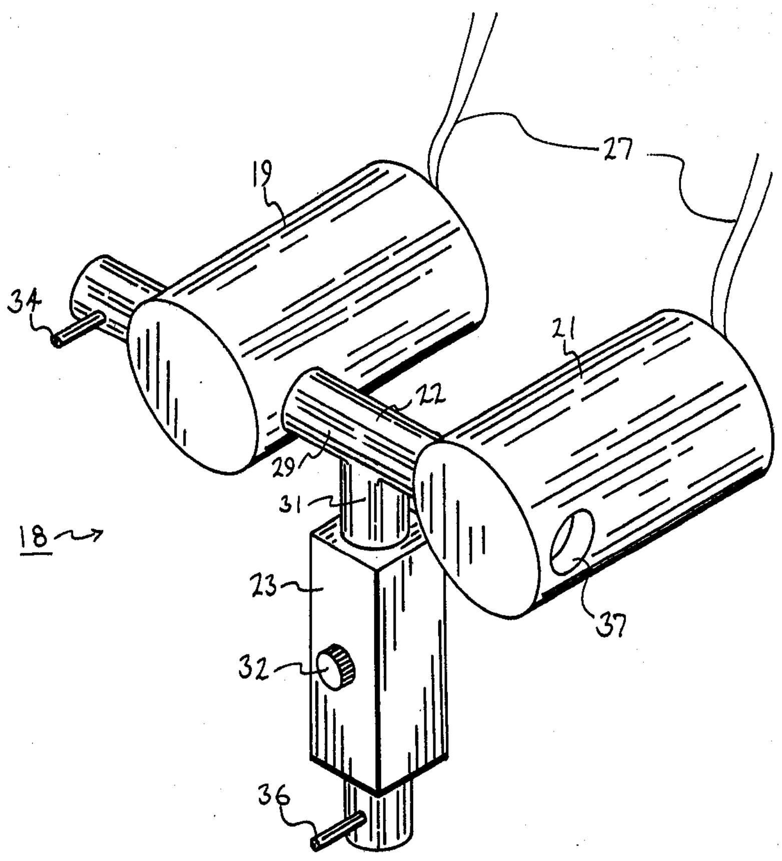
FIG. 2 is a perspective view of the digital pneumatic modulator of the invention.

Referring now to FIG. 2, the digital pneumatic modulator (18) includes generally a first and second solenoid valve (19 and 21), a pneumatic T intersection (22), and a flow control unit (23).

Each solenoid valve (19 and 21) has a pneumatic pathway (24 and 25) (FIG. 3) disposed radially therethrough, thereby forming an input and exhaust port on opposing sides of each solenoid valve (19 and 21) (FIG. 2). These solenoid valves (19 and 21) operate electrically. Upon applying an appropriate electric signal to either solenoid valve (19 and 21) through the conductors (27) provided, a removeable obstacle (28) (FIG. 3) that otherwise blocks the pneumatic pathway (24 or 26) through the solenoid valve (19 or 21) (FIG. 2) will be moved to thereby provide an unobstructed pneumatic pathway through the solenoid valve (19 or 21). Upon removing the electrical signal, the obstruction will enter the pneumatic pathway and again block the pneumatic pathway. Valve number 141110 as manufactured by Kip, Inc. has been found to work suitably in this application.

The pneumatic T intersection (22) of the digital pneumatic modulator (18) may be of any suitable type, so long as the part provides for two intersecting pneumatic pathways (29 and 31). The solenoid valves (19 and 21) are each appropriately connected to opposite ends of the arm (29) of the pneumatic T intersection (22). This connection may be by threaded joinder or by any other means of operable connection suitable for maintaining the integrity of a pneumatic passageway. The leg (31) of the pneumatic T intersection (22) connects similarly to a flow control unit (23).

The flow control unit (23) essentially constitutes a pneumatic pathway having an input port and an exhaust port. A pneumatic flow through this pathway may be controlled by selectively varying a moveable obstruction located within the pathway. Such obstructions are usually moveable by manipulation of an exterior mounted control shaft or knob (32).

Unlike the solenoid valves (19 and 21) which operate to either completely block the pneumatic passageway through them, or to allow free passage therethrough, the obstruction located within the flow control unit (23) may be varied over a wide range to coincidentally provide a similarly wide range of flow control. The importance of this particular element of the digital pneumatic modulator (18) will be made more clear below. It has been found that a flow control unit (23) such as part No. N125B BL as manufactured by Rego works satisfactorily in this application.

Finally, the digital pneumatic modulator (18) includes appropriate connecting mechanisms to allow the modulator (18) to pneumatically interface with a supply of pressurized air (33) (FIG. 1) and with a cylinder unit (13). More particularly, the remaining unconnected port of the first solenoid valve (19) (FIG. 2) has a connecting stem (34) operably joined thereto. By this provision, a supply of pressurized air (33) (FIG. 1) may be pneumatically connected to the digital pneumatic modulator (18). Similarly, the exhaust port of the flow control unit (23) (FIG. 2) has another connecting stem (36) appropriately joined thereto. This connecting stem (36) facilitates operable pneumatic joinder of the digital pneumatic modulator (18) to a cylinder unit (13) (FIG. 1). The remaining port of the second valve (21) (FIG. 2) unit remains unconnected and serves as an exhaust port (37) to the atmosphere.

Referring again to FIG. 1, a generically represented pneumatic control system for a facility management operation will now be generally described. It should be noted that for purposes of illustration and to otherwise aid in an explanation of this invention, the facility management system described will monitor and control but a single parameter; temperature. This limitation has been adopted for ease and clarity of explanation only, and should not be viewed as a limitation upon the scope of the invention itself. It will be clear to those skilled in the art that the invention described would be applicable with respect to the monitoring and control of any number of facility management parameters.

The sensor unit (11) may be any one of many sensor units already well-known in the prior art. Therefore, no more detailed description of such sensors need be provided here. The sensor unit (11) must respond to a particular preselected facility parameter, in this case temperature. Each sensor unit (11) must also be appropriately located wherever necessary to suitably monitor that parameter.

Signals from the sensor unit (11) are operably directed to a pneumatic control unit (12). Such units are also well-known in the art, and typically operate by comparing the sensor indications with a preselected temperature or temperature range. Should the sensor reading indicate an acceptable environmental condition, the pneumatic control unit (12) will remain quiescent. Where the monitored temperature exceeds or falls below the preselected comparative temperature range, however, the pneumatic control unit (12) will operate to effect a downstream modification that should ultimately cause the monitored temperature to return to an acceptable status.

In a pneumatic facility management system, the pneumatic control unit (12) typically connects directly to a cylinder unit (13) (as shown in phantom at numeral 38). Such cylinder units are well-known in the art, and therefore only a general description need be provided here. Cylinder units commonly include an airtight cylinder housing having a piston snugly but moveably disposed therein. The piston will usually include an axially mounted shaft or the like that extends exterior of the cylinder. Therefore, when the piston moves within the cylinder housing, the shaft, and anything attached to the shaft, will move as well.

One variety of cylinder unit (13) includes a pneumatic port disposed through the cylinder housing distal the shaft end of the housing. The piston will be spring biased away from the shaft end of the cylinder housing. By introducing a gas through the port, the cylinder may be pressurized such that the piston will be urged towards the shaft end of the cylinder housing in opposition to the spring resistance. Upon exhausting the pressurized gas through this same port, the spring will urge the piston to return to its original position.

In a second typical variety of cylinder, known as a push-pull cylinder, the cylinder housing will include a second port disposed through the housing at the end opposite the first port. This cylinder unit will not usually have any internal springs. The piston may be moved within the cylinder by allowing pressurized gases to either enter or exit the cylinder on either side of the piston through either of the ports.

As will be shown in more detail below, the digital pneumatic modulator (18) of the invention will accommodate either variety of cylinder unit (13).

Finally, the cylinder unit (13) operably connects as described above to a preselected controlled device (14). Using the above-mentioned illustrative example, the controlled device (14) might be a ventilating duct damper, a window opening mechanism, a boiler control, or any other device that would affect temperature in the monitored area.

Operation of a pneumatic facility management system may be briefly described as follows. The sensor unit (11) senses a particular parameter in a particular area, such as temperature in a given room. This sensor (11) provides information regarding the monitored temperature to the pneumatic control unit (12). The pneumatic control unit (12) compares this relayed information with a preselected value or range. Upon sensing, for instance, that the temperature has dropped below an accepted range, the pneumatic control unit (12) would operate to open (or close, as the case may be), particular pneumatic pathways between a supply of pressurized air (33) and the cylinder unit (13), such that the cylinder unit (13) may be used to manipulate a controlled device (14) that will assist in raising or lowering the temperature in the monitored area.

Having described a typical pneumatic facility management system, placement of the digital pneumatic modulator (18) within the system will now be described.

In essence, the pneumatic passageway (38) is disconnected from the cylinder unit (13) and connected to the supply input connection pipe (34) of the digital pneumatic modulator (18). The output pipe (36) of the flow control unit (23) of the digital pneumatic modulator (18) may then be connected to the cylinder unit (13) by an appropriate length of pneumatic tubing (shown in block diagram form at numeral 39 in FIG. 1). This completes the connection of the digital pneumatic modulator (18) to the pneumatic facility management system.

It will be appreciated that if the solenoid valves (19 and 21) used in the digital pneumatic modulator (18) are normally open in the absence of an appropriate electrical signal, the pneumatic facility management system will operate with the digital pneumatic modulator (18) installed precisely the same as it did without the digital pneumatic modulator (18), assuming that the solenoid valves (19 and 21) are not energized.

Upon energizing the first solenoid valve (19), however, it will be appreciated that pressurized air cannot flow from the supply (33) through the pneumatic control unit (12) and to the cylinder unit (13). Any such flow of air will be blocked by the obstruction presented by the energized first solenoid valve (19).

With the digital pneumatic modulator (18) so connected, an electronic control unit (17) and sensor unit (16) may be connected in parallel with the existing pneumatic facility management system. The electronic sensor unit (16) provides essentially the same services as is previously described counterpart (11). It should be noted, however, that electronic sensors as a group are generally more accurate and provide more instantaneous or real time monitoring of the selected parameter.

Similarly, the electronic control unit (17) performs the function of comparing the signal from the sensor unit (16) with a preselected electronic representation of the desired point or range for the monitored parameter. Upon sensing an undesirable condition, the electronic control unit (17) will provide appropriate electrical signals at its output to ultimately affect the monitored parameter. For the applications described herein, such an electronic control unit (17) may be provided by the use of a Microcontroller unit from either the MCU-100 series or the MCU-500 series (as manufactured by Anderson Cornelius) and an appropriate Microinterface control output module (also as available from Anderson Cornelius).

Figure 3:
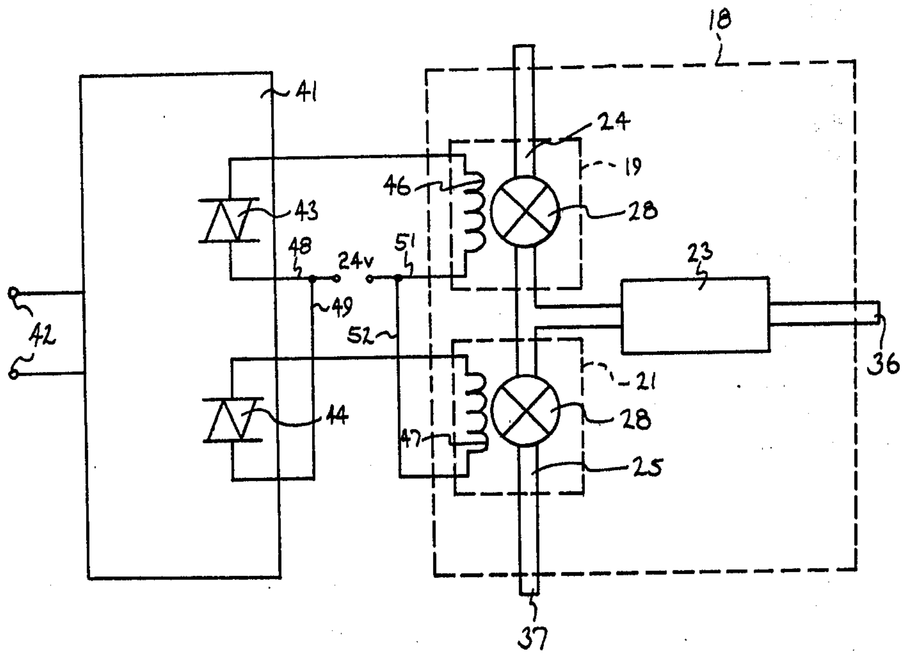
FIG. 3 is a schematic representation of the digital pneumatic modulator of the invention.

Referring now to FIG. 3, connection of the digital pneumatic modulator (18) to such an electronic control unit (17) will be described. A Microinterface control output module (41) is depicted in block diagram form, with Microcontroller input connections depicted by the numeral 42 and the triggering triacs located within the module (41) depicted by the numerals 43 and 44. The digital pneumatic modulator (18) has been represented in FIG. 3 in a schematic format, such that the two smaller phantom-lined boxes represent the two solenoid valves (19 and 21) and the large phantom box represents the digital pneumatic modulator (18). (Identifying numerals specified earlier for various parts of the digital pneumatic modulator (18) are used in FIG. 3 to represent like parts.)

The first output triac (43) of the Microinterface module (41) connects to the inductor coil (46) of the first solenoid valve (19). Similarly, the second output triac (44) of the Microinterface module (41) connects to the inductor (47) of the second solenoid valve (21). The remaining leads (48 and 49) of the two output triacs are then externally connected to a 24 volt DC supply. Similarly, the remaining lead (51 and 52) of each solenoid valve inductor (46 and 47) each connects to the ground side of that same 24 volt source.

Assuming that the solenoid valves (19 and 21) so represented are normally closed in the absence of an appropriate electrical signal, the operation of the digital pneumatic modulator (18) viz-a-vis the electronic control unit (17) may be described as follows. Upon receiving an appropriate signal from the Microcontrol unit, the Microinterface unit (41) will cause the first output triac (43) to conduct, thereby completing a closed loop that includes the inductor (46) of the first solenoid valve (19). This signal will therefore cause the first solenoid valve (19) to open and thereby allow pressurized air to flow through the solenoid valve (19) and through the flow control unit (23) to the exit port (36). Upon removing the trigger signal from the first output triac (43), the loop will be opened and the solenoid valve (19) de-energized. The first solenoid valve (19) will then assume its normally closed state, and pressurized air may no longer flow therethrough.

Similarly, upon triggering the second output triac (44), the second solenoid valve (21) will be energized, and complete a pneumatic pathway between the exhaust port (37) of the second solenoid valve (21) and the exhaust port (36) of the flow control unit (23).

Referring again to FIG. 1, the complete operation of the system as depicted may now be described. First, it should be noted that operation of the pneumatic control unit (12) has not been abrogated by parallel inclusion of the electronic control unit (17) through the digital pneumatic modulator (18). Rather, the two control systems may operate in tandem. So combined, however, the pneumatic control unit (12) should be adjusted to essentially operate as a backup unit, and the electronic control unit (17) adjusted to tend the moment-to-moment burdens of controlling the monitored parameter.

To refer again to the illustrative example used above, it may be presumed that this particular system has as its function the monitoring and control of temperature in a particular room. The operator desires to maintain the temperature of that room at 21° C. (69.8° F.) with no more than a 0.5° C. (0.9° F.) variation on either side of the set point. To further complete the illustration, it may be assumed that the controlled device (14) operated by this system is a damper in a heating duct. In order to cause the damper to open, pressurized air must be introduced into the cylinder unit (13). In order to cause the damper to close, pressurized air within the cylinder unit (13) must be allowed to exhaust.

The pneumatic control unit (12) may be adjusted to close the supply line between the supply of pressurized air (33) and the digital pneumatic modulator (18) at any temperature exceeding 22° C. (71.6° F.). The electronic control unit (17) may be adjusted with a set point of 21° C. (69.8° F.) and an acceptable range of 0.5° C. (0.9° F.) on either side of the set point.

Assuming a temperature reading of 21° C. (69.8° F.), the facility management system will operate as follows. The pneumatic control unit (12) will already have opened the line between the supply of pressurized air (33) and the digital pneumatic modulator (18). This pressurized air will not reach the cylinder unit (13), however, because the 21° C. (69.8° F.) reading represents an accepted reading for the electronic control unit (17). Therefore, the electronic control unit (17) will not energize the appropriate solenoid valve (19) that would otherwise allow pressurized air to reach the cylinder unit (13).

If the temperature now drops to 20.4° C. (68.72° F.), the electronic control unit (17) will note the disparity between the monitored temperature and the accepted temperature range. The result will be the energization of the first solenoid valve (19). Pressurized air will be supplied through the pneumatic control unit (12) (since it has remained open) and through the digital pneumatic modulator (18) to the cylinder unit (13). This will cause the piston to move the damper such that the damper will be opened and warm air allowed to reach the monitored site.

Similarly, as the temperature rises past the appropriate preselected range, the electronic control unit (17) will energize the second solenoid valve (21) and allow the pressurized air in the cylinder unit (13) to exhaust. This results in the piston returning to its normal position such that the damper closes.

It will be appreciated that an electronic control unit (17) that is sensitive to the rate of change of the monitored temperature could interface even more efficiently with the digital pneumatic modulator (18). In this case, the operator need not be limited to a choice of only a completely open or a completely closed damper. Rather, by pulsing the solenoid valves (19 and 21), the electronic control unit (17) may effectively pulse the cylinder unit (13) with short pulses of pressurized air, or in the reverse, short pulses of exhaust time. By this method, the damper may be maintained in any number of positions between the completely closed and the completely open configuration.

When using the Microcontroller and the Microinterface units noted above, another valuable characteristic of the digital pneumatic modulator (18) becomes apparent. The Microcontroller unit operates by essentially comparing the monitored parameter with a preselected set point or range, and then operates to send encoded instructions in the form of pulses of varying frequencies to the Microinterface unit. For instance, the Microinterface unit can be adjusted to interpret a zero hertz pulse as an instruction to trigger the first output triac (43), a 15 hertz pulse as a signal to untrigger both triacs (43 and 44), and a 30 hertz pulse as a signal to trigger the second output triac (44).

Under these circumstances, of course, a zero hertz signal from the Microcontrol unit to the Microinterface unit will result in the energization and hence opening of the first solenoid valve (19). A 30 hertz pulse will result in the energization and hence opening the second solenoid valve (21). Finally, a 15 hertz pulse will result in the de-energization and hence closing of both the solenoid valves (19 and 21).

So configured and adjusted, it will be appreciated that if the electronic control unit (17) experiences a failure in the Microcontrol unit itself, in the sensor (16), or in the transmission lines connecting these various upstream elements, a zero hertz signal will be provided to the Microinterface unit. As a result, the first solenoid valve (19) will be energized and will remain open. With the first solenoid valve (19) open, of course, pressurized air may move from the pneumatic control unit (12) to the cylinder unit (13). In other words, the facility management system will continue to operate with the pneumatic control unit (12) as a backup system even though the electronic control unit (17) has failed. Any number of alarm devices may be provided to alert the operator that the electronic control unit (17) has failed, and in the meantime, the operator need not concern himself with the emergency he might otherwise face if the system had no backup.

Yet another advantage of the described invention may be more fully appreciated at this point. A great variety of cylinder units (13) are currently available for accomplishing control functions that require varying degrees of power in order to effectuate the intended control. Such cylinder units (13) are available to operate on air pressurized as little as 0.211 kg/sq. cm (3 lbs./sq. in.) over atmospheric conditions, all the way to 1.758 kg/sq. cm (25 lbs./sq. in.) over atmospheric conditions. The flow control unit (23) included in the digital pneumatic modulator (18) will allow the digital pneumatic modulator to accommodate virtually any of these available cylinder units (13). For a small cylinder unit, the flow control unit (23) may be significantly constricted, such that an opening of the solenoid valve (19) will still only allow a small amount of pressurized air to flow through to the cylinder unit (13) during the short pulse time the solenoid (19) is energized. At the other extreme, the flow control unit (23) may be adjusted wide open to accommodate the larger cylinder units (13).

It has also been noted that cylinders are available both with a single pneumatic input and a spring-biased piston, or as a push-pull mechanism. The pneumatic digital modulator (18) can easily accommodate the former as described above. In addition, the modulator (18) will accommodate a push-pull cylinder if the operator connects the exhaust port (37) of the second solenoid valve (21) to the second input port of such a cylinder. In other words, this single described mechanism may be suitably used with any existing cylinder unit found in the prior art as used in facility management systems.

The digital pneumatic modulator (18) may be used, of course, to interface between a cylinder unit (13) and an electronic control unit (17) without the need for including a pneumatic control unit (12) as well. For instance, in a completely new installation, the operator may well decide to forego the duplicative installation of a pneumatic control system in addition to the electronic control system. In this situation, the operator simply connects the supply of pressurized air (33) directly to the input port of the first solenoid valve (19).

When upgrading an already installed pneumatic control system, however, the digital pneumatic modulator (18) may be used as described above to allow the installation of an electronic control unit (17) while preserving the integrity of the pneumatic control unit (12) such that the latter may function as a backup system.

The digital pneumatic modulator (18) therefore facilitates the construction of a facility management system that allows an operator to gain the benefits of accuracy and speed inherent in an electronic control unit and also the efficiency and precision inherent in a pneumatic cylinder unit. Perhaps most importantly, this combination allows the cylinder unit (13) to operate with a precision not obtained with pneumatic control units or even with prior art interface units that serve to connect an electronic control unit with a cylinder unit. This interfacing may be accomplished with this invention with a minimum of parts and expense, with a concurrent ability to incorporate a pre-existing pneumatic control system as a backup system, and with an ability to accommodate any currently available cylinder unit as used in facility management systems.

Various modifications upon this described invention will be obvious to those skilled in the art. Such modifications are not to be considered as outside the scope of the claims.

I claim:

1. In a facility management system having first sensor means for sensing a preselected facility parameter and for providing a signal in response to such sensing, pneumatic control means operably connected to said sensor means for providing a pneumatic control signal in response to the signal provided by said sensor means, controlled device means for selectively affecting the prselected facility parameter, and pneumatic cylinder means operably connected to said controlled device means whereby the selective introduction and exhaust of pressurized air to and from said pneumatic cylinder means will control the extent to which said controlled device means will affect the preselected facility parameter; an improvement comprising a parallel control system that utilizes said first sensor means and said pneumatic control means as a backup system, the improvement including:

a. second sensor means for sensing the same preselected facility parameter as said first sensor means and for providing a signal in response to such sensing;

b. electronic control means operably connected to said second sensor means for electronically comparing the signal provided by said second sensor means with a predetermined signal that relates to a desired status for the sensed parameter and for providing an electronic control signal in response thereto;

c. a digital pneumatic modulator including:

i. first and second solenoid valves, each such valve having a pneumatic pathway formed completely therethrough that may be selectively blocked and unblocked by appropriate energization and de-energization of said solenoid valves, and means pneumatically connecting the first solenoid valve to the pneumatic control means to receive pressurized air therefrom;

ii. a pneumatic T intersection unit having a first and second pneumatic pathway formed therethrough, one end of said first pneumatic pathway being pneumatically connected to the pneumatic pathway of said first solenoid valve and the other end of said first pneumatic pathway being pneumatically connected to the pneumatic pathway of said second solenoid valve, the latter valve including an exhaust port, and the second pneumatic pathway being formed to have one end pneumatically intersect said first pneumatic pathway, and to have the other end serve as an output port;

iii. a flow control unit having a pneumatic pathway formed therethrough with a selectively variable obstacle disposable therein, one end of said pneumatic pathway being pneumatically connected to the output port of said second pneumatic pathway of said pneumatic T intersection unit and the other end of said pneumatic pathway being operably connectable to said pneumatic cylinder means;

wherein said first and second solenoid valves are operably connected to said electronic control means such that said solenoid valves may be selectively energized and de-energized thereby, said pneumatic cylinder means is pneumatically connected to the pneumatic pathway of said flow control unit, and a supply of pressurized air is pneumatically connected to the pneumatic pathway of said first solenoid valve; whereby said electronic control means will control said controlled device via said pneumatic cylinder means by transmitting electronic control signals to said digital pneumatic modulator which signals control the solenoid valves of said modulator to thereby selectively introduce and exhaust pressurized air to and from said pneumatic cylinder means.

2. The improvement of claim 1 wherein said flow control unit may be selectively adjusted such that said digital pneumatic modulator may be used with any said pneumatic cylinder means having a rating of between .211 kg./sq.cm above atmospheric conditions to 1.758 kg./sq.cm above atmospheric conditions.

3. The improvement of claim 1 wherein said electronic control means can evaluate the rate at which the pre-selected facility parameter changes and can provide an electronic control signal that relates to such evaluated rate of change, the first and second solenoid valves of the improvement being operable to allow a plurality of short pulses of pressurized air to selectively enter and exhaust said pneumatic cylinder means in response to the electronic control signal.

* * * * *